United States Patent [19]

Vachon et al.

[11] 4,257,928
[45] Mar. 24, 1981

[54] POLYESTER ADHESIVES

[75] Inventors: Raymond N. Vachon; Hazel R. R. Partin, both of Kingsport, Tenn.

[73] Assignee: Permabond International Corporation, Englewood, N.J.

[21] Appl. No.: 116,129

[22] Filed: Jan. 28, 1980

[51] Int. Cl.³ .......................... C08K 5/05; C08K 5/13
[52] U.S. Cl. .......................... 260/33.4 R; 260/29.2 E; 260/30.4 R; 260/31.2 XA; 260/32.8 R; 528/295; 528/302; 528/303
[58] Field of Search .................. 260/29.2 E, 30.4 R, 260/33.4 R, 31.2 XA, 32.8 R; 528/295, 302, 303

[56] References Cited
U.S. PATENT DOCUMENTS

| | | | |
|---|---|---|---|
| 3,261,812 | 7/1966 | Bell et al. | 528/295 |
| 3,310,512 | 3/1967 | Curtice | 260/29.2 E |
| 4,104,262 | 8/1978 | Schade | 528/295 |
| 4,107,150 | 8/1978 | Campbell et al. | 528/302 X |
| 4,156,073 | 5/1979 | Login | 528/295 |
| 4,167,395 | 9/1979 | Engelhardt | 528/295 X |
| 4,193,906 | 3/1980 | Hatanaka | 260/33.4 R |

Primary Examiner—Lucille M. Phynes

[57] ABSTRACT

Disclosed are adhesive compositions which are solid but spreadable to form a coating on substrates. Solutions of the adhesive composition are formed into a gel in a useful form such as a stick. The adhesive composition comprises dibenzal sorbitol gelling agent and polyesters derived from components (A), (B) and (C) as follows:

(A) at least one dicarboxylic acid, (B) at least one diol, at least 20 mole percent of the diol component being a poly(ethylene)glycol having the formula $H\text{-}(OCH_2CH_2)_n OH$ wherein n is an integer of from 2 to about 14, and (C) at least one difunctional dicarboxylic acid sulfomonomer containing a —$SO_3M$ group attached to an aromatic nucleus, wherein M is $Na^+$, $Li^+$, $K^+$ or a combination thereof, the sulfomonomer component constituting at least about 8 mole percent to about 45 mole percent of the sum of the moles of said components (A) and (C).

9 Claims, No Drawings

POLYESTER ADHESIVES

BACKGROUND OF THE INVENTION

1. Field of the Invention

This invention relates generally to adhesive sticks, and more particularly to adhesive compositions comprising a water-dispersible polyester and dibenzal sorbitol formed into an adhesive stick.

2. Description of the Prior Art

Adhesive sticks are known in the art. For example, U.S. Pat. Nos. 3,964,832 and 3,576,776 relate to gel compositions useful as carriers for various adhesive compositions. Furthermore, it is known in the art to use dibenzal sorbitol as a gelling agent for solid adhesives of poly(vinyl pyrrolidone), poly(vinyl formal), poly(vinyl butyral), poly(vinyl alcohol), poly(vinyl acetate), vinyl acetate copolymers, nitrocellulose and poly(vinyl chloride). See for example, Japanese Pat. Nos. J4909-067; J50078-628; J50317-646; J53023-337; JA-4844329-Q; JA-4840835-Q and J49036-740.

SUMMARY OF THE INVENTION

The present invention provides an adhesive composition which is solid but spreadable to form a coating on substrates. The adhesive composition is formed into a gel in a useful form such as a stick. The adhesive composition comprises a water dispersible polyester and dibenzal sorbitol gelling agent. The water dispersible polyesters are derived from components (A), (B) and (C) as follows:

(A) at least one dicarboxylic acid,
(B) at least one diol, at least 20 mole percent of the diol component being a poly(ethylene)glycol having the formula $H-OCH_2CH_2)_nOH$ wherein n is an integer of from 2 to about 14, and
(C) at least one difunctional dicarboxylic acid sulfomonomer containing a $-SO_3M$ group attached to an aromatic nucleus, wherein M is $Na^+$, $Li^+$, $K^+$ or a combination thereof, the sulfomonomer component constituting at least about 8 mole percent to about 45 mole percent of the sum of the moles of said components (A) and (C);

The adhesives according to the present invention provide a paper-tearing bond in a surprisingly short time and have excellent tear stength on kraft paper.

DETAILED DESCRIPTION OF THE INVENTION

According to the present invention, there is provided an adhesive composition which is solid but spreadable to form a coating on substrates. The adhesive composition is practical over a temperature range of from about $-10°$ C. to about $50°$ C. Solutions of the adhesive composition are formed into a gel in a useful form such as a stick. The adhesive composition comprises a water dispersible polyester and dibenzal sorbitol gelling agent. Dibenzal sorbitol is the reaction product of benzaldehyde and sorbitol, and is a white powder with an apparent density of 0.01. Dibenzal sorbitol is sometimes called dibenzylidene sorbitol.

The water dispersible polyesters useful in this invention are derived from components (A), (B) and (C) as follows:

(A) at least one dicarboxylic acid,
(B) at least one diol, at least 20 mole percent of the diol component being a poly(ethylene)glycol having the formula $H-OCH_2CH_2)_nOH$ wherein n is an integer of from 2 to about 14, and
(C) at least one difunctional dicarboxylic acid sulfomonomer containing a $-SO_3M$ group attached to an aromatic nucleus, wherein M is $Na^+$, $Li^+$, $K^+$ or a combination thereof, the sulfomonomer component constituting at least about 8 mole percent to about 45 mole percent of the sum of the moles of said components (A) and (C);

The dicarboxylic acid component (A) from which the linear water-dissipatable polyester component of this invention is prepared can be any aliphatic, cycloaliphatic, or aromatic acid. Examples of such dicarboxylic acids include oxalic; malonic; dimethylmalonic; succinic; glutaric; adipic; trimethyladipic; pimelic; 2,2-dimethylgultaric; azelaic; sebacic; fumaric; maleic; itaconic; 1,3-cyclopentanedicarboxylic; 1,2-cyclohexanedicarboxylic, 1,3-cyclohexanedicarboxylic; 1,4-cyclohexanedicarboxylic; phthalic; terephthalic; isophthalic; 2,5-norbornanedicarboxylic; 1,4-naphthalic; diphenic; 4,4'-oxydibenzoic; diglycolic; thiodipropionic; 4,4'-sultonyldibenzone; and 2,5-naphthalenedicarboxylic acids. In a preferred embodiment of this invention isophthalic acid is the dicarboxylic acid utilized. If terephthalic acid is used as the dicarboxylic acid component of the polyester, especially good results are achieved when at least five mole percent of one of the other acids listed above is used.

It should be understood that the use of the corresponding acid anhydrides, esters, and acid chlorides of these acids is included in the term "dicarboxylic acid". The esters are preferred, examples of which include dimethyl 1,4-cyclohexanedicarboxylate; dimethyl 2,6-naphthalenedicarboxylate; dibutyl 4,4'-sulfonyldibenzoate; dimethyl isophthalate; dimethyl terephthalate; and diphenyl terephthalate. Copolyesters may be prepared from two or more of the above dicarboxylic acids or derivatives thereof.

At least about 20 mole percent of the diol component (B) used in preparing the water-dissipatable polyester component of the invention is a poly(ethylene)glycol having the formula $H(-OCH_2CH_2)_nOH$ wherein n is an integer of from two to about ten. Examples of suitable poly(ethylene)glycols include diethylene, triethylene, tetraethylene, pentaethylene, hexaethylene, heptaethylene, octaethylene, nonaethylene, and decaethylene glycols, and mixtures thereof. Preferably the poly(ethylene)glycol employed in the polyester of the present invention is diethylene glycol, triethylene glycol or mixtures thereof. The remaining portion of the diol component is at least one aliphatic, cycloaliphatic or aromatic diol. Examples of these diols include ethylene glycol; propylene glycol; 1,3-propanediol; 2,4-dimethyl-2-ethylhexane-1,3-diol; 2,2-dimethyl-1,3-propanediol, 2-ethyl-2-butyl-1,3-propanediol; 2-ethyl-2-isobutyl-1,3-propanediol, 1,3-butanediol; 1,4-butanediol; 1,5-pentanediol; 1,6-hexanediol; 2,2,4-trimethyl-1,6-hexanediol; 1,2-cyclohexanedimethanol; 2,2,4,4-tetramethyl-1,3-cyclobutanediol; and p-xylylenediol. Copolymers may be prepared from two or more of the above diols.

The third component (C) used to prepare the water-dissipatable polyester is a difunctional monomer containing a $-SO_3M$ group attached to an aromatic nucleus, wherein M is hydrogen or a metal ion. This difunctional monomer component may be either a dicarboxylic acid (or derivative thereof) containing a $-SO_3M$ group or a diol containing a $-SO_3M$ group.

The metal ion of a sulfonate salt group may be Na+, Li+, or K+.

The —SO$_3$M group is attached to an aromatic nucleus, examples of which include benzene, naphthalene, anthracene, diphenyl, oxydiphenyl, sulfonyldiphenyl and methylenediphenyl.

Especially good results are obtained when the difunctional monomer is the sodium salt of a sulfoisophthalic, sulfoterephthalic, sulfophthalic, or 4-sulfonaphthalene-2,7-dicarboxylic acid (or derivatives of such acids). A highly preferred monomer is 5-sodiosulfoisophthalic acid or derivative thereof such as 5-sodiosulfodimethyl isophthalate.

Other effective difunctional monomers containing a —SO$_3$M group attached to an aromatic nucleus include metal salts of aromatic sulfonic acids (or esters thereof). These monomers are described, including methods for their preparation, in U.S. Pat. No. 3,528,947. Examples of preferred monomers are 4-sodiosulfophenyl-3,5-dicarbomethoxybenzenesulfonate, 4-lithiosulfophenyl-3,5-dicarbomethoxybenzenesulfonate and 6-sodiosulfo-2-naphthyl-3,5-dicarbomethoxybenzenesulfonate.

Other effective difunctional monomers containing a —SO$_3$M group attached to an aromatic nucleus include metal salts of sulfodiphenyl ether dicarboxylic acids (or esters thereof). Examples of preferred monomers here are dimethyl 5-[4-(sodiosulfo)phenoxy]isophthalate, dimethyl 5-[4-(sodiosulfo)phenoxy]-terephthalate, and 5-[4-(sodiosulfo)phenoxy]isophthalic acid.

The water-dissipatable polyester should contain at least about eight mole percent of the monomer based on total acid content, with about 10 mole percent giving particularly advantageous results. Greater dissipatability is achieved when the difunctional monomer constitutes from about 10 mole percent to about 45 mole percent of the total content of acid of the polyester.

To obtain the polyester component of this invention, the difunctional monomer containing the —SO$_3$M group may be added directly to the esterification reaction mixture from which the polyester will be made. Thus, these monomers can be used as a component in the original polyester reaction mixture. Other various processes which may be employed in preparing these polyesters are well known in the art and are illustrated in such patents as U.S. Pat. Nos. 2,465,319; 3,018,272; 2,901,466; and 3,075,952. These patents illustrate ester interchange and polymerization processes.

Whenever the term "inherent viscosity" (I.V.) is used in this description, it will be understood to refer to viscosity determinations made at 25° C. using 0.5 gram of polymer per 100 ml. of a solvent composed of 60% phenol and 40% tetrachloroethane as parts by weight. In addition, whenever the terms "dissipatable", "dissipated" or "dissipate" are used in this description, it will be understood to refer to the action of water or aqueous solutions on the components of the blends of this invention. The terms are specifically intended to cover those situations wherein the solution dissolves and/or disperses these blends.

In an especially preferred embodiment of this invention the water-dissipatable polyester component is derived from 90 mole percent isophthalic acid, 10 mole percent of 5-sodiosulfoisophthalic acid, and 100 mole percent of diethylene glycol and having an inherent viscosity (I.V.) of at least 0.30 as measured at 25° using 0.50 gram of polymer per 100 ml. of a solvent composed of 60 percent phenol and 40 percent tetrachloroethane. The copolyester useful in this invention may be terminated with either hydroxy or carboxy end-groups. In addition, the end-group functionality of the copolyester, and therefore its crosslinkability, may be increased by reaction of the high molecular weight linear polyester with tri- or tetrafunctional hydroxy or carboxy compounds such as trimethylolpropane, pentaerythritol, or trimellitic anhydride in a manner known in the art.

The dibenzal sorbitol gelling agent is a commercially available compound, for example Gel ALL-D, a product of New Japan Chemical Company. The dibenzal sorbitol is used in an amount of from about 5 to about 20% by weight, based on the weight of the polyester.

Small amounts, i.e., up to about 10% by weight of the polyester, of other additives may be used in the adhesive compositions according to this invention. For example, polymers such as polyvinyl pyrrolidone, polyvinyl alcohol, etc., may be included. Also, conventional polyester plasticizers and stabilizers, as well as pigments, fillers, dyes, etc., may be included.

The adhesive compositions according to this invention are generally prepared by mixing an aqueous solution or dispersion of the polyester with a solution of the dibenzal sorbitol and other additives, if used. Solutions of the polyester may contain from about 65 to about 85 percent by weight water, with about 70% water being preferred. The dibenzal sorbitol may be dissolved in organic hydrocarbon solvents such as, for example, ethanol. The solution may be heated to reflux and stirred until the dibenzal sorbitol is dissolved, then either allowed to cool to room temperature and gel or kept as a solution by heating. The polyester solution and the dibenzal sorbitol gel or solution are then mixed in proportions such that the dibenzal sorbitol is present in an amount of between about 5% and about 20% by weight, based on the weight of polyester. The mixture so prepared is heated to distill off the azeotrope of ethanol and water. The solution which remains is poured into containers and allowed to gel. The composition may conveniently be in the form of rods which may be used as an adhesive stick.

The following examples are submitted for a better understanding of the invention. In the examples and tables below, the following abbreviations are used:

a—a polyester of
    82 mole % isophthalic acid
    18 mole % 5-sodiosulfoisophthalic acid
    54 mole % diethylene glycol
    46 mole % 1,4-cyclohexanedimethanol b—a polyester of
    89 mole % isophthalic acid
    11 mole % 5-sodiosulfoisophthalic acid
    78 mole % diethylene glycol
    22 mole % 1,4-cyclohexanedimethanol c—fiber tear d—Gel All-D dibenzal sorbitol e—a polyester of
    90 mole % isophthalic acid
    10 mole % 5-sodiosulfoisophthalic acid
    100 mole % diethylene glycol f—a polyester of 100 parts of
    82 mole % isophthalic acid
    18 mole % 5-sodiosulfoisophthalic acid
    54 mole % diethylene glycol
    46 mole % 1,4-cyclohexanedimethanol, and
    10 parts Carbowax 600 g—poly(vinyl pyrrolidone)—MW=40,000 h—poly(vinyl pyrrolidone)—MW=360,000 i—polyvinyl alcohol, fully hydrolyzed, medium molecular weight

EXAMPLE 1

Four g. of dibenzal sorbitol are dissolved in 200 g. of ethanol. The clear solution is decanted from a slight amount of insoluble material and allowed to gel on cooling. To 25 g. of a 30% dispersion of polyester e is added 25 g. of the gel. The components are dissolved by heating, and most of the ethanol is removed by boiling at atmospheric pressure. The remaining solution is poured into a plastic tube where it gels on cooling. The gel spreads easily on writing paper and forms a paper-tearing bond one minute after application.

EXAMPLE 2

Example 1 is repeated except 50 g. of the ethanol solution of dibenzal sorbitol gel is used. After removal of most of the ethanol, the remaining solution forms a firm gel which can be spread on paper and forms a paper-tearing bond one minute after application.

EXAMPLE 3

Example 1 is repeated, except that the polyester is derived from 85 mole percent isophthalic acid, 15 mole % 5-sodio sulfoisophthalic acid, 92 mole % diethylene glycol and 8 mole % 1,4-cyclohexanedimethanol is used. A gel is formed which tears paper one minute after application.

EXAMPLE 4

The same as Example 2 except that polyester f is used. A gel is formed which also tears paper one minute after application.

EXAMPLE 5

To 50 g. of 30% polyester e is added 1 g. of poly(vinyl pyrrolidone) of 360,000 molecular weight and 1 g. glycerine at room temperature. The blend is heated to 80° C. and 75 g. of a 2% dibenzal sorbitol solution in ethanol gel is added. 70 Ml of the 96/4 ethanol/water azeotrope is removed and the remaining dispersion is poured into a polyethylene tube and allowed to gel. The gel spreads easily on brown kraft paper and forms a paper-tearing bond 90 sec. after appliction. The T-peel bond strength after 24 hours at 23° C. of brown kraft paper bonded with the adhesive is 1.6 lb./in. and the paper tears.

EXAMPLE 6

This example illustrates the formation of a paper bond with poly(vinyl pyrrolidone) in the absence of the water-dispersible polyester.

37.5 g. of 30% poly(vinyl pyrrolidone), MW of 4,000, and 12.5 g. of 30% poly(vinyl pyrrolidone) MW of 360,000 are mixed and heated to 80° C. 75 g. of 2% dibenzal sorbitol in ethanol is added and 70 ml of the ethanol/water azeotrope is removed. The resulting dispersion is poured into a polyethylene tube and gells on cooling. Brown kraft paper to which the gel is applied does not form paper-tearing bond in 720 minutes. The T-peel bond strength of brown kraft paper bonded with the blend of poly(vinyl pyrrolidone) is only 0.2 lb./in. with no fiber tear after 25 hrs. at 23° C.

EXAMPLES 7–26 (See following Tables)

To 300 g. of ethanol is added 6 g. of dibenzal sorbitol at room temperature. The ethanol is quickly heated to reflux and stirred for 15–30 minutes until the dibenzal sorbitol dissolves. The insoluble material that remains is allowed to settle and the clear solution is poured into a jar and allowed to cool and gel.

To 50 g. of 30% polyester e heated at 80° C. is added 75 g. of the gelled ethanol solution of dibenzal sorbitol. The mixture is heated and stirred and 70 g. of the ethanol/H$_2$O azeotrope is removed. The remaining solution is poured into disposable syringes whose tips have been cut off and allowed to gel. The syringes are capped to minimize the loss of ethanol.

When additives such as starch or poly(vinyl pyrrolidone) are used, they are added to the polyester dispersion at room temperature then heated to 80°–90° C. for 15 minutes after which the dibenzal sorbitol is added. The time for the adhesive to form a paper-tearing bond is determined by spreading the adhesive on one edge of brown kraft paper using 5 strokes of the stick. Another sheet of the paper is placed on the first and pressed together. Samples are split by hand every 15 seconds. The shortest time required for the adhesive to tear the paper is designated as the set-up time.

The T-peel bond strength is obtained on samples of brown kraft paper which have been bonded with the glue sticks and allowed to set for 24 hours and 1 week at room temperature and 1 week at 50° C. The bond strength is obtained with an Instron Tester and 2 inches/minute peel rate. The strength of the bondes is determined by the so-called "Peel Test" based on a modification of the ASTM "T-Peel Test" set forth on pages 63 and 64 of the 1964 edition of the BOOK OF ASTM STANDARDS, published by the American Society for Tesing Materials, and more specifically identified as Test Number D-1876-61-T.

TABLE 1

ADHESION TO KRAFT PAPER OF GLUE STICKS CONTAINING WATER-DISPERSIBLE POLYESTERS

| Example | Composition (Solids | Bond T-Peel Strength lb./inch width | | | Set-Up Time (Time To Fiber Tear) |
|---|---|---|---|---|---|
| | | After 24 Hrs. at 23° C. | After 1 Week at 23° C. | After 1 Week at 50° C. | |
| 7 | Polyvinyl Pyrrolidone-Based Adhesive | 1.3 c | 1.3 c | 1.4 c | >1 Hour |
| 8 | Polyvinyl Pyrrolidone-Based Adhesive | 1.2 c | 1.5 c | 1.5 c | 15–30 Min. |
| 9 | 15/1.5 e/d | 1.1 c | 1.5 c | 1.4 c | 75 Sec. |
| 10 | 15/1.4 f/d | 0.8 Slight c | 0.9 c | 0.6 c | 90 Sec. |
| 11 | 15/1.5 a/d | 0.6 Slight c | 0.7 No c | 1.0 c | 105 Sec. |
| 12 | 15/.75/1.5 a/Glycerine/d | 0.5 Slight c | 0.7 Slight c | 0.5 Slight c | 90 Sec. |

TABLE 1-continued
ADHESION TO KRAFT PAPER OF GLUE STICKS CONTAINING WATER-DISPERSIBLE POLYESTERS

| Example | Composition (Solids) | Bond T-Peel Strength lb./inch width | | | Set-Up Time (Time To Fiber Tear) |
|---|---|---|---|---|---|
| | | After 24 Hrs. at 23° C. | After 1 Week at 23° C. | After 1 Week at 50° C. | |
| 13 | 15/1.5/1.5 a/glycerine/d | 0.6 Slight c | 0.4 Slight c | 0.4 Slight c | 75 Sec. |
| 14 | 15/1.5 b/d | 0.4 Slight c | 0.8 Slight c | 0.5 Slight c | 105 Sec. |

TABLE 2
THE EFFECT OF ADDITIVES ON THE ADHESIVE PROPERTIES OF WATER-DISPERSIBLE POLYESTERS

| Example | Composition (Solids) | Bond T-Peel Strength lb./inch width | | | Set-Up Time (Time To Fiber Tear) |
|---|---|---|---|---|---|
| | | After 24 Hrs. at 23° C. | After 1 Week at 23° C. | After 1 Week at 50° C. | |
| 15 | 12/3/1.5 e/g/d | 0.5 Slight c | 1.2 c | 0.8 Slight c | 120 Sec. |
| 16 | 15/1.5 g/d | 0.2 No c | 0.1 No c | 0.3 No c | 20-30 Min. |
| 17 | 7.5/7.5/1.5 e/g/d | 0.9 c | 0.6 Slight c | 0.1 No c | 10 min. |
| 18 | 15/1/1.5 e/h/d | 1.4 c | 1.5 c | 1.3 c | 60 Sec. |
| 19 | 15/1/1/1.5 e/h-Ethylene Glycol/d | 1.2 c | 1.1 c | 1.1 c | 75 Sec. |
| 20 | 11.25/3.75/1.5 g/h/d | 0.2 No c | 0.1 No c | 0.1 No c | >20 Min. |
| 21 | 15/0.75/1.5 a/Glycerine/Starch/d | 0.9 c | 1.0 c | 0.7 Slight c | 75 Sec. |
| 22 | 15/1/1/1.5 e/h/Glycerine/d | 1.6 c | 1.6 c | 1.6 c | 90 Sec. |
| 23 | 15/0.5/0.1/1/1.5 e/h/Glycerine/d | 0.8 c | 0.6 Slight c | 0.9 c | 90 Sec. |
| 24 | 15/1/1.5 e/starch/d | 1.5 c | 1.2 c | 1.5 c | 45 Sec. |
| 25 | 15/1/1/1.5 e/i/Glycerine/d | 0.3 c | 0.4 c | 0.2 c | 120 Sec. |
| 26 | 15/1/2/1.5 e/i/Glycerine/d | 0.3 No c | No Bond | 0.5 Slight c | 120 Sec. |

Unless otherwise specified, all parts, percentages, ratios, etc. are on a weight basis.

The invention has been described in detail with particular reference to preferred embodiments thereof, but it will be understood that variations and modifications can be effected within the spirit and scope of the invention.

We claim:

1. An adhesive composition which is spreadable as a coating onto paper, said composition comprising a linear, water-dissipatable polyester derived essentially from
    (A) at least one dicarboxylic acid,
    (B) at least one diol, at least 20 mole percent of said diol being a poly(ethylene glycol) having the formula

    H-(-OCH$_2$CH$_2$-)$_n$-OH wherein n is an integer of from two to about ten, and
    (C) at least one difunctional dicarboxylic acid sulfomonomer containing a —SO$_3$M group attached to an aromatic nucleus, wherein M is hydrogen or Na$^+$, Li$^+$, K$^+$, or a combination thereof, said sulfo-monomer constituting at least about 8 mole percent to about 45 mole percent of the sum of the moles of said components (A) and (C), and from about 5 to about 20% by weight, based on the weight of said polyester, of dibenzal sorbitol.

2. An adhesive composition according to claim 1 wherein the polyester contains, as component (B), a polyethylene glycol selected from diethylene glycol, triethylene glycol and mixtures thereof.

3. An adhesive composition according to claim 1 wherein the polyester contains, as component (A), terephthalic acid and at least 5 mole % of another aliphatic, cycloaliphatic or aromatic acid.

4. An adhesive composition according to claim 1 wherein said —SO$_3$M group of the sulfomonomer is attached to a benzene nucleus.

5. An adhesive composition according to claim 1 wherein the polyester is derived from about 80-95 mole percent isophthalic acid, about 20-5 mole percent 5-sodiosulfoisophthalic acid and about 95-100 mole percent diethylene glycol.

6. An adhesive composition according to claim 1 wherein said sulfomonomer consists essentially of 5-sodiosulfoisophthalic acid.

7. An adhesive composition according to claim 1 wherein said polyester has an inherent viscosity of at least 0.30.

8. An adhesive composition according to claim 1 comprising from about 90 to about 99.5 weight percent of said polyester and from about 10 to about 0.5 weight percent of polyvinyl pyrrolidone or polyvinyl alcohol.

9. An adhesive composition in the form of an elongated stick which is substantially solid at room temperature and spreadable as a coating onto paper at temperatures of from about −10° C. to about 50° C., said composition comprising a linear, water-dissipatable polyester derived essentially from
    (A) from about 80-95 mole percent isophthalic acid,
    (B) at least one diol, at least 20 mole percent of said diol being diethylene glycol, triethylene glycol or mixtures thereof,
    (C) from about 20-5 mole percent 5-sodiosulfoisophthalic acid, and from about 5 to about 20% by weight, based on the weight of said polyester, of dibenzal sorbitol.

* * * * *